United States Patent [19]

Ho

[11] Patent Number: 5,038,662
[45] Date of Patent: Aug. 13, 1991

[54] METHOD AND APPARATUS FOR TEACHING THE PRODUCTION OF TONE IN THE BOWING OF A STRINGED INSTRUMENT

[76] Inventor: Tracy K. Ho, 66-56 Sanders St., Rego Park, N.Y. 11374

[21] Appl. No.: 505,771

[22] Filed: Apr. 5, 1990

[51] Int. Cl.[5] .................. G09B 15/00; G10G 1/00; G10H 3/18
[52] U.S. Cl. ............................. 84/723; 84/453; 84/477 R
[58] Field of Search .................. 84/723–742, 84/256, 274, 453, 477 R, 470 R

[56] References Cited
U.S. PATENT DOCUMENTS
4,882,965 11/1989 McClish ...................... 84/726

Primary Examiner—Stanley J. Witkowski
Attorney, Agent, or Firm—Jones, Day, Reavis & Pogue

[57] ABSTRACT

A method of and apparatus for teaching and learning the production of good tone in bowing a stringed instrument uses electrical signals corresponding to position and velocity of a bow, bow pressure on the strings and sounding point. The signals are converted from analog electrical signals to digital electrical signals and taken to a computer which processes them for display and storage. Use of the computer and a monitor permits real-time display for instant evaluation of bowing technique by a student or teacher, and the possibility of storing the digital information and replaying it at any time allows the comparison of different performances by the student and also the study of results obtained by a teacher or a master performer and the comparison of these results with those obtained by the student.

6 Claims, 6 Drawing Sheets

METHOD AND APPARATUS FOR TEACHING THE PRODUCTION OF TONE IN THE BOWING OF A STRINGED INSTRUMENT

BACKGROUND OF THE INVENTION

This invention is a method of and an apparatus for teaching and learning the techniques for bowing stringed instruments. In particular, it is a method of and an apparatus for performing the following functions. It detects one or more bowing point positions on a bow and on the strings of the stringed instrument, determines the velocity of the bow, determines the bowing force and processes that information in a computer to provide real-time feedback to a student or other user of the bow on the stringed instrument. The invention may also provide comparisons for the student of his or her technique with that of a teacher or any model to enable the student to make technical changes to achieve a better tone.

Traditional ways of teaching the playing of the violin and other bowed stringed instruments rely on the teacher to convey what is required of the student. It is predicated on the subjective requirement that the student learn the various methods as perceived by the teacher. This teaching approach has shortcomings. Sound is abstract; the teacher's relation of tone by the verbal-and-demonstration approach may not be fully understood by the student. A teacher, and in particular a good teacher, may also not be available to help the student solve problems in tone production. A tool to assist the teacher in filling the communication gap and in augmenting the human teacher's efforts would be very useful.

Tone production is a critical element in violin playing. Tone quality is often the primary criterion used to differentiate an accomplished or professional violinist from an amateur or unskilled one. Many theories have been formulated on the subject of violin playing. However, the technique of producing good tone remains one of the most difficult skills that advanced violinists have to master.

In general, good tone production is dependent mostly upon good bow control. Violinists exert subtle control over their instruments and bows to produce the sounds they desire, and it is in the area of tone production that most difficulties arise. A teacher always wants a student to play in a certain way to produce a certain tone that the teacher desires. The teacher is therefore constantly trying to contrast the differences in tone produced by the teacher and that produced by the student, hoping to minimize those differences.

Many violin teachers try to communicate their concepts of tone through verbal description, demonstration or both. However, verbal descriptions of tone quality are often inadequate to convey understanding to a student. The experience of each person is different, and so his or her perceptions differ from those of others. To explain verbally how a tone should sound is too limiting.

Demonstration of tone quality by the teacher is another technique that is often used to teach tone quality. It relies very much on the ability of the student to imitate or emulate the teacher. However, having a good teacher as a model is often a matter of luck. And even if a student is able to study with a good model teacher, the student may not be able to keep up with the requirements set by that teacher for various reasons. The teacher may require that a certain amount of work be done within a given time period, but the student may not be able to do the work in time. Should the student fall behind, he or she may not be able to catch up easily or at all. A void that needs to be filled may arise, one that, when filled, will help the student violinist a great deal.

Technology in recent years has had a revolutionary impact on the music profession. The computer has been extensively used in Computer-Assisted Instruction and Computer-Based Training in music. These new trends have helped music students acquire musical skill and knowledge in a variety of areas ranging from drill-and-practice ear training to open-ended programs of musical composition. However, most of the applications involving computers have used synthesized sound sources. It would be useful to have a system for monitoring as many as four of the key parameters relating to the hand holding the bow that affect tone production on stringed instruments. The four parameters are bow position, bow pressure, bow velocity, and sounding point, the place on the string where the bow contacts the string. The four parameters offer various combinations which represent a large number of possibilities.

In order to improve playing technique, a systematic evaluation of the variables would be very helpful to students of the violin and other bowed stringed instruments such as the viola, cello, bass viol, the hwu-chyn family, a group of bowed Chinese stringed instruments, and the like. This would help students to learn with or without a teacher present. Such a system would further help students understand how a tone is produced. Based on the system's analytical results of the parameters, students will be able to make final adjustments after viewing data so obtained. Mechanical adjustments are involved; however, they are made based on interpreting the parameter data. Likewise, using this system would allow a teacher or a student to focus on the parameters of bow movement themselves rather than on the physical mechanics of body or finger movements. The students would then be better able to attain an improved tone on a stringed instrument.

Producing a desirable tone has traditionally been the most critical phase in learning to play a stringed instrument, especially a violin. Previous efforts at improving tone production on the violin fall into two categories, described here as the traditional approach and the technology-based method. Until very recently, most efforts in violin pedagogy had relied on following the recommendations of master performers serving as teachers. In *Violin Playing As I Teach It*, Leopold Auer in 1921 defined "an entirely agreeable tone" as "a tone which is singing to a degree that leads the hearer to forget the physical process of its development." This abstract concept may mean different things to different students. For guidance in this regard, Auer wrote, "The students must rely upon the precepts of the great masters of the past and the great violinists of the present day." Auer concluded that clear and complete understanding, the gift of seizing and retaining the explanations of a good teacher, is the only practical way of achieving a beautiful tone. Auer in his book described the violin teaching of his teacher, Joachim, who, without much elaboration, required his students to listen and imitate his playing. Joachim theorized that verbal communication is unnecessary in teaching. Auer therefore contended that "teaching without demonstration" is "dumb teaching."

These two violin masters belonged to the school believing the teacher, who is in the position to demonstrate, to be the ultimate learning model for the student.

In contrast, other more recent violin pedagogues have used a more scientific approach to violin tone production. In her many publications, such as *A New Approach To Violin Playing*, 10th Edition, originally published in 1961, the renowned violin teacher Kato Havas in 1988 further expounded on the definition of sound. She cited some of the many writings of Leslie Taylor, who described tone quality in his *Teachers' Training Course* as follows. "What is very remarkable about the harmonics series is that the timbre of an instrument depends on the presence or absence, or relative strength or weakness, of the various harmonics." Havas also notes that the quality of a musical sound depends not only on the fundamental note but also on its harmonics. She essentially emphasized that to hear the various mixtures of harmonics and to exercise good control of the base joints of the left hand and the right arm in the case of right-handed violinists are critical to the production of good tone. This also emphasizes the role of coordination between the right and left hands in solving the problems of tone production.

Percival Hodgson in 1934 studied violin bowing problems from the anatomical aspect as well as the acoustical, mechanical and geometrical aspects. In his *Motion Study and Violin Bowing*, American String Teachers Association, 1934 (1958), he tried to solve the problems of bowing by means of scientific motion studies. Compared to the so-called "elbow, wrist, . . . " schools, it is an advanced approach to the study of violin bowing. However, before a violin student reaches the advanced stage in his or her studies, too much emphasis on physical motion may mislead that student into giving priority to the control of motion itself instead of to the production of a desired tone.

The well-known violin teacher Ivan Galamian in 1962 wrote a great deal on the subject of tone production. In his *Principles of Violin Playing & Teaching*, Prentice-Hall, N.J., 1962, he theorized that good tone production is dependent upon two factors, the flexible springlike action of the arm and bow, and the motion of the stroke at substantially a right angle to the long dimension of the string. There are three fundamental factors involved in the motion of the bow stroke, according to Galamian at page 55:

(1) the speed of the bow stroke;
(2) the pressure exerted by the bow on the strings; and
(3) the location of the sounding point, the point at which the bow contacts the string.

These three factors are interdependent in that a change in any one of them will require a corresponding adjustment in at least one of the others. When change occurs in all three factors, a great number of combinations can result, according to Galamian. This theory gives us a more rational direction in the search for proper ways to attain a desirable tone, even though it may not be easy for the violin student to grasp. This is because applying the theory may involve many different combinations of the parameters. The violin student may not have the ability to master certain parameter combinations at any given stage of his or her development.

In view of all these speculative theories, there have been some prior studies on how such parameters affect the sound that is produced. Some technologically-based investigations of tone production on the violin have recently been undertaken. Some of those appear to be based upon the theories put forth by the violin pedagogues cited above and also those of other pioneers.

Burton Kaplan was one such pioneer. In his U.S. Pat. No. 3,730,964, "Method and Apparatus for Instruction of Stringed Instrument Bow Positioning," which is incorporated by reference as if set forth fully here, Kaplan discussed how a bow position sensor that was secured to a stringed instrument and an indicator that responded to the sensor would provide an indication to the student of each departure of the bow from a desirable position. In another patent of his, U.S. Pat. No. 3,726,175, "Apparatus for Instruction of Stringed Instrument Positioning," Kaplan used an attitude sensor instead of a bow-position sensor. Both of these patents emphasized "bow position during play," which is the same as the "sounding point." It therefore seems likely that the "sounding point" is crucial, since Kaplan was a renowned violin teacher, and chose to focus his studies on the "sounding point."

Andre Askenfelt in 1986 also examined strategies for measuring scientifically the impact of these production parameters in a paper entitled "Measurement of bow motion and bow force in violin playing" in *Journal of the Acoustical Society of America* 80 (4) October 1986, which is incorporated by reference as if set forth fully here. In this work, three parameters characterizing bow control by a player under normal playing conditions were measured simultaneously by a piece of equipment. The method of measuring these three parameters is briefly described as follows.

1. Bow position was measured by embedded a piece of resistive wire in the bow hair while the violin strings were connected to the ground of an external Wheatstone bridge. The bridge was adjusted to balance when the middle part of the bow was in contact with the string. Hence, other bow positions gave positive or negative signals accordingly.
2. Bow velocity was obtained by differentiating the bow position signals with respect to time.
3. Bow pressure was obtained by mounting sensors for bow force, comprising four strain gauges, on bronze strips through which the bow hairs were fastened to the bow. These gauges were connected to a second Wheatstone bridge.

Because of varying contact resistance, the precision of the measurements was low. When the bow was brought into contact with the strings in a sudden manner after it left the strings, some interfering signals were produced.

In summary, Burton Kaplan and Andre Askenfelt both examined aspects of violin tone production, but neither attempted to interpret the outcome, and neither stored or analyzed the interactive properties of the parameters.

SUMMARY OF THE INVENTION

It is an object of the present invention to provide a better method of and apparatus for teaching the techniques of bowing a stringed instrument.

It is a further object of the present invention to provide a method of and an apparatus for providing to a student of a stringed instrument a visual display of objective indications of aspects of his or her bowing technique.

It is a further object of the present invention to provide a real-time display of bowing parameters to assist in the teaching of bowing techniques for stringed instruments.

Other objects will become apparent in the course of a detailed description of the invention.

A method of and an apparatus for teaching the techniques of bowing a stringed instrument are adapted to monitor up to four parameters critical to tone production in the stringed instrument and to display some or all of the parameters as a function of time. Sensors measure bow pressure, bow velocity, bow position and sounding point. Strain gauges and resistive wires attached to the instrument and the bow produce signals associated with these parameters, each of which signals is taken after any necessary processing to an analog-to-digital converter and then to a personal computer, preferably one having at least 640 kilobytes of random-access memory. The system collects, displays and stores on-line information about these parameters while the instrument is played, and the stored information can be replayed for study and analysis. The system thus makes possible the comparison of performances by different players, experts and novices, and of different performances by the same player. Such comparisons are useful to a teacher in teaching bowing techniques and they are useful to a student in learning how to produce good tone.

DETAILED DESCRIPTION OF THE INVENTION

Figure 1:
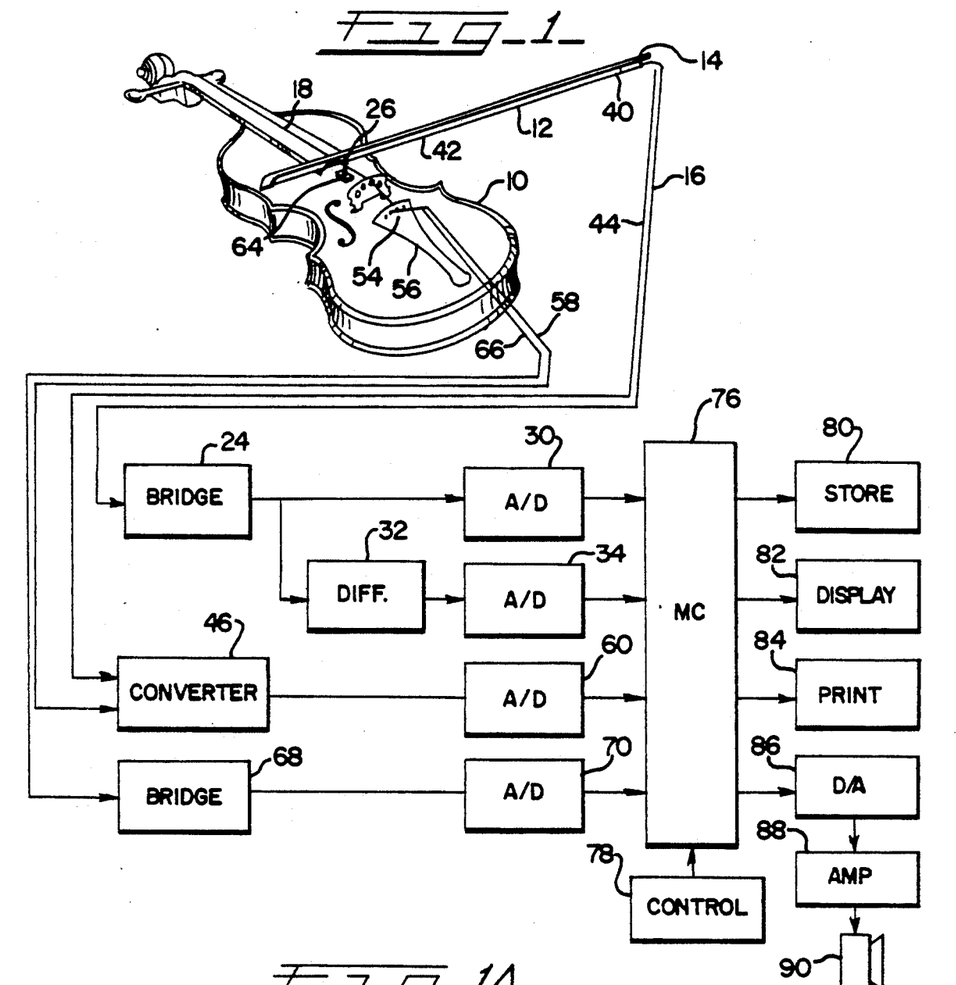
FIG. 1 is a functional block diagram of an apparatus for the practice of the present invention.

FIG. 1 is a functional block diagram of an apparatus for the practice of the present invention. In FIG. 1, a violin 10 is shown as the stringed instrument. This is a matter of choice, since the invention would work equally as well to teach the bowing of other stringed instruments such as violas, cellos, bass viols, double basses, members of the hwu chyn family and the like. A position sensor 12 is located in a bow 14 to provide a signal in a line 16 that is a measure of the position of the bow 14 on the strings 18 of the violin 10. Only one string 18 is shown in FIG. 1 for clarity, and while it is possible to make measurements on more than one string, one string will usually suffice for teaching purposes. Thus, the typical teaching setup will have one measuring string out of the four. The position sensor 12 is typically a piece of resistive wire 20 that is connected along with the bow hairs 22 so that a comparison of the electrical resistance between the bowing point and one end of the bow 14 with the resistance between the bowing point and the other end of the bow 14 provides a measure of bow position.

The line 16 is connected to a bridge 24 which produces an electrical signal that is proportional to the distance of the point of contact 26 with the bow 14. That electrical signal is taken to an analog-to-digital (A/D) converter 30 to produce a digital signal that is a measure of bow position. The signal from the bridge 24 is also taken to a differentiator 32, which differentiates the signal with respect to time to produce an analog signal that is proportional to velocity of the bow 14 with respect to the string 18. That analog signal is taken to an A/D converter 34 to produce a digital signal that is a measure of bow velocity. The algebraic sign of the velocity is arbitrary, but it was convenient to take as positive the measure obtained when the bowing hand was moving the bow 14 toward the violin 10.

Another signal from the bow 14 is obtained from a strain gage 40 that is located in the bow 14 to measure tension in the bow strings 42. This signal is taken on a line 44 to a converter 46. Tension in the strings of the violin 10 is measured by a strain gage 54 which is located in the frog 56 of the violin 10, producing a signal that is taken on a line 58 to the converter 46. The converter 46 amplifies the signals on the lines 44 and 58, combines the signals to provide a composite measure of bowing force, and applies the combined signal to an A/D converter 60, producing a digital signal that is a measure of bowing force.

The sounding point, the point on the string 18 where the bow 14 makes contact, could be measured in many ways. In an apparatus that has been built for the practice of the present invention, the sounding point was measured by a sliding resistor 64 that was caused to move by physical contact with the bow 14. This developed a signal that was taken on a line 66 to a bridge 68, which developed an analog signal. This analog signal was taken to an A/D converter 70 to produce a digital signal that was a measure of the sounding point.

The A/D converters 30, 34, 60 and 70 were connected to a microcomputer 76 for processing. The microcomputer 76 can be a personal computer, preferably one with at least 640 kilobytes of random-access memory. FIG. 1 shows symbolically the control unit 78 that is connected to the microcomputer 76 to control it. A storage unit 80 typically comprises both a hard disk and a diskette, with associated drives. A display 82 is typically a monitor cathode-ray tube, preferably a color monitor, and a printer 84 provides for paper records.

The apparatus of the present invention can also be used to play previously recorded music along with the information that describes the bowing that produced it. Thus, when such information is stored in the storage unit 80, it can be directed through the microcomputer 76 to a digital-to-analog (D/A) converter 86 which recovers an analog signal and delivers the analog signal to an amplifier 88, then to a speaker 90. The ability to hear one's playing while watching the signals describing the bowing that produced the sound assists in teaching and learning. The opportunity to hear the playing of a master artist and to see the signals that describe the associated bowing is another form of assistance in learning proper bowing.

Figure 1A:
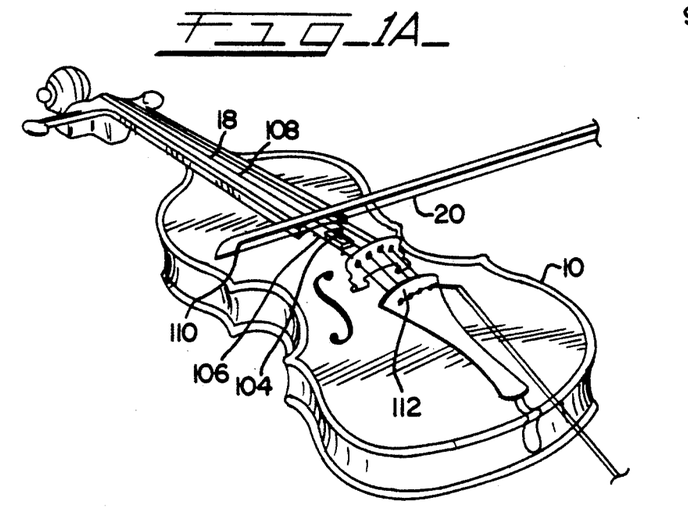
FIG. 1A is a symbolic rendering of the mechanical apparatus used in the practice of the invention.

FIG. 1A is a symbolic rendering of the mechanical apparatus used in the practice of the invention. In FIG. 1A, a rider 104 is attachable to the violin 10 of FIG. 1 to mark a location of the bow 14 on the string 18. The rider 104 marks a position on a slide-wire resistor 106 that can be determined by a bridge measurement or the like. A conductor 108 makes electrical contact with the resistive wire 20 of FIG. 1 to measure bow position. A strain gage 110 in the bow 14 produces a signal that is combined with a signal produced by a strain gage 112 that is a part of the attachment of the strings 18 to the violin 10. Taken together, the signals produced by the strain gages 110 and 112 provide a measure of bowing force.

The use of a rider to sense the sounding location of the bow tends to interfere with the performer. In the alternative, a linear array of light-sensitive detectors can be embedded or otherwise attached to the stringed instrument under the strings in the bowing region. This can be either a linear array of high-resolution CCD (charge-coupled devices) such as those used in optical scanners, or it can be an array of relatively low-tech miniature photodetectors. A few (three to five) optical fibers, driven by one or more LEDs (light-emitting diodes) and glowing with the characteristic colors of the LED throughout the whole length, can be included in the bow string as the light source. Matching optics will be required to focus the image of the lighted fiber on the optical sensors. The optics include a cylindrical lens with a short focal length to focus the light and a band-pass filter centered on the LED colors to cut down background noise due to room light. Under playing conditions, only one or two of these detectors will be activated at any one time, enabling measurement of the location of the sounding point.

Figure 1B:
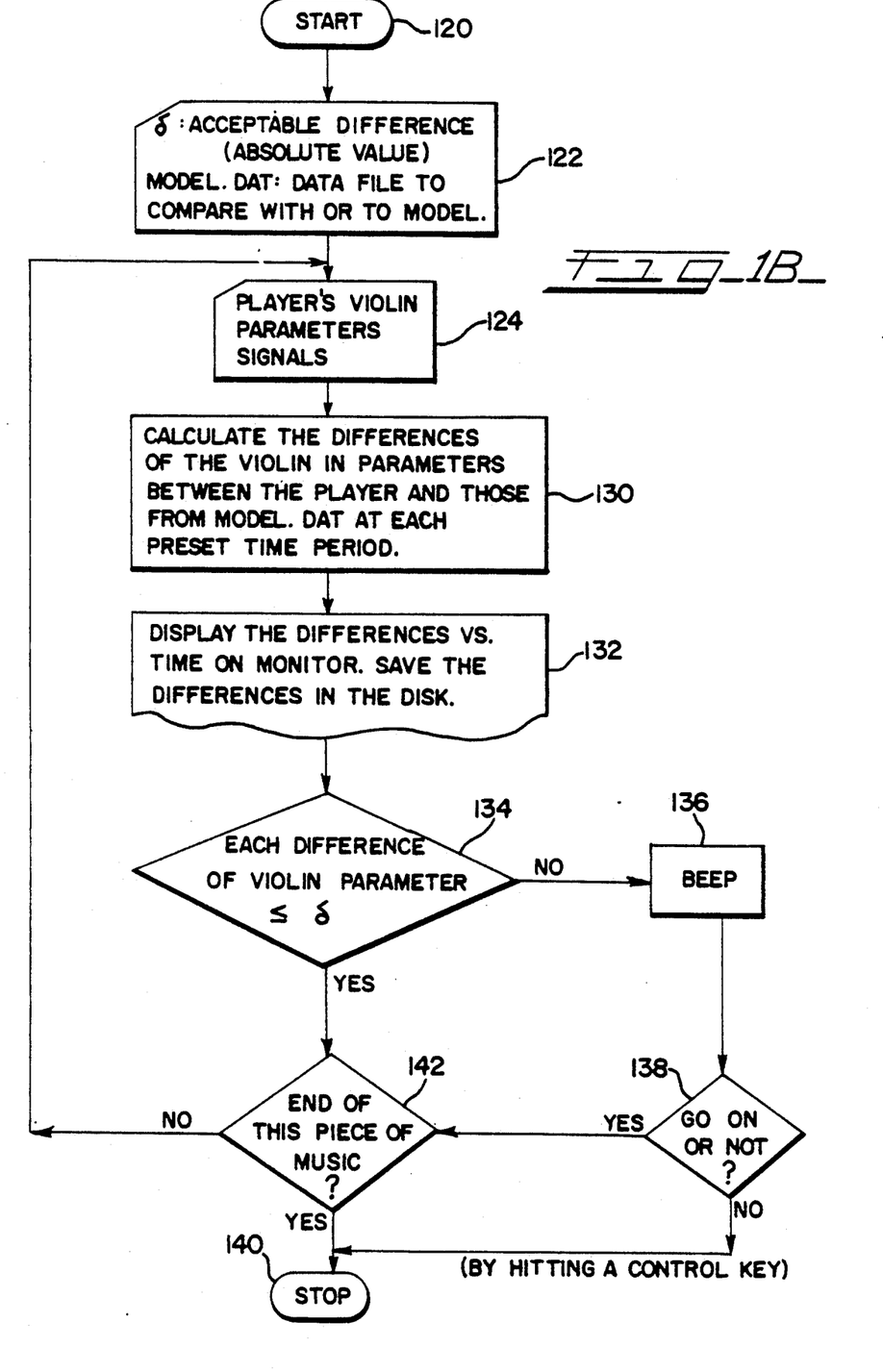
FIG. 1B is a flow chart of a program to control the microcomputer of the present invention.

FIG. 1B is a flow chart of a program that was installed in the microcomputer 76 to control the microcomputer 76 in the practice of the present invention. In FIG. 1B, a start block 120 enables a block 122 that defines as a predetermined value an acceptable difference between an observed performance value and a comparison performance value. A block 124 calls for a player's bowing parameter signals, obtained as shown in FIG. 1. A block 130 then directs the calculation of the differences between the stored parameter values and the values produced by the player. A display control 132 calls for display of the differences as a function of time on the display 82 of FIG. 1 and also calls for storage of those differences in the storage unit 80 of FIG. 1. A decision block 134 next tests whether each difference of the observed parameter is less than the predetermined difference value that was entered in the block 122. If it is not less, a block 136 calls for the sounding of a beep and a decision block 138 tests whether a control key has called for a stop. If a control key is operated, the decision block 138 calls a stop block 140 and the program stops. If the control key is not operated, and if the decision block 134 finds that the differences of the parameters is less than or equal to the predetermined value, a decision block 142 tests to see of the music is over. If it is not, control returns to the block 124 and the cycle repeats. If the music is over, control returns to the stop block 140 and the program stops.

It should be evident that the program described above will also control display of either a live rendition of music or of a previously recorded performance if no data file is entered to compare with the performance. In this case, the block 136 would normally be disabled to avoid interference with the performance.

Figure 2:
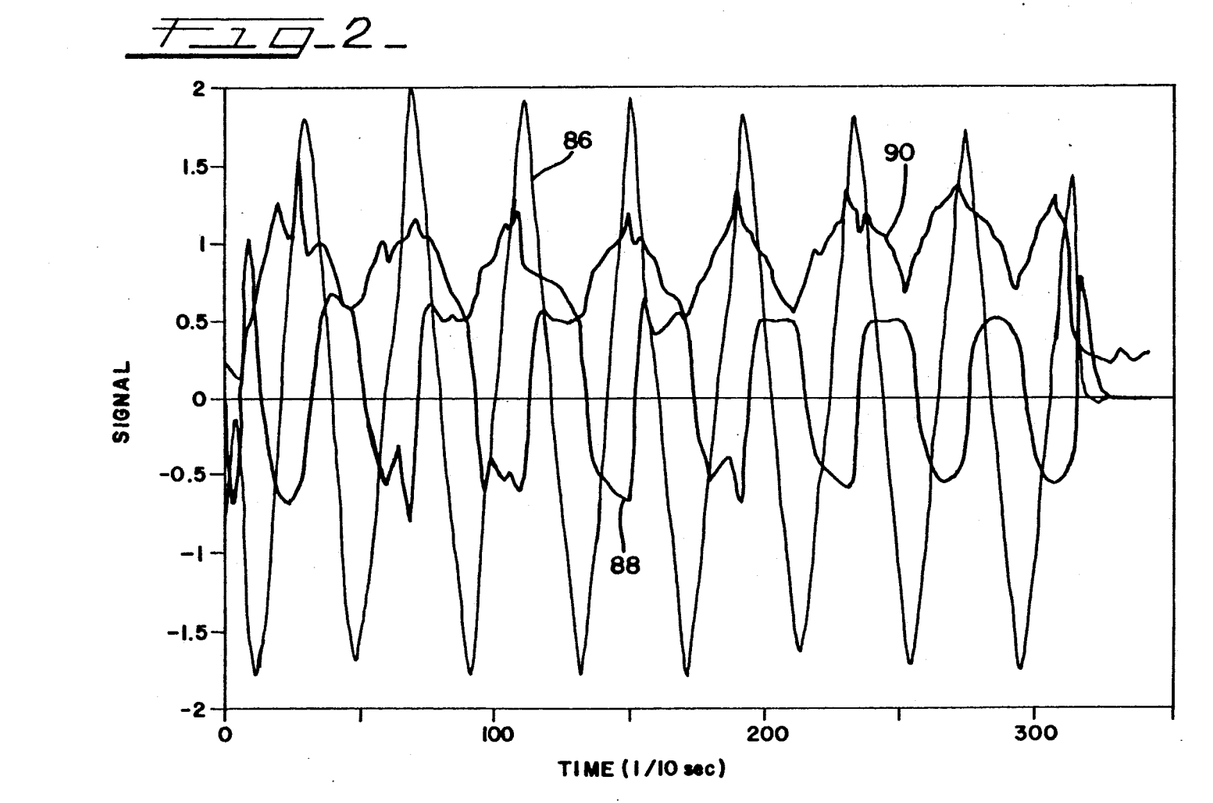
FIG. 2 is a time plot of parameters obtained with the apparatus of the present invention.
Figure 3:
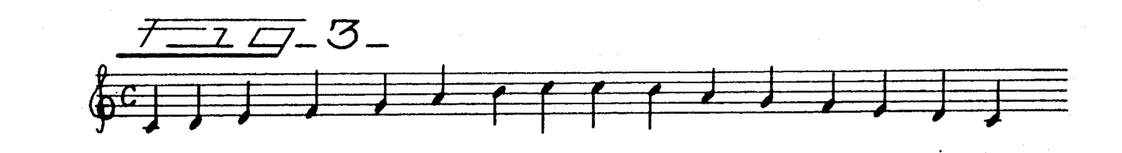
FIG. 3 is a musical scale showing what is being played and its timing in FIG. 2.

FIG. 2 is a time plot of parameters obtained with the apparatus of the present invention, and FIG. 3 is a musical scale showing what is being played and its timing. In FIG. 2, an accomplished violinist is playing up and down the scale, as indicated by FIG. 3. A curve 86 shows bow position, a curve 88 shows the negative of bow velocity and a curve 90 shows bow pressure. A cursory inspection of FIG. 2 shows that bow velocity and bow pressure are relatively constant during a long and slow bowing interval for each note, and that the ascending scale is being performed with parameters that are quite close to those of th descending scale. Observations such as these and others that could be made from the curves of FIG. 2 can assist a student in improving bowing technique.

Figure 4:
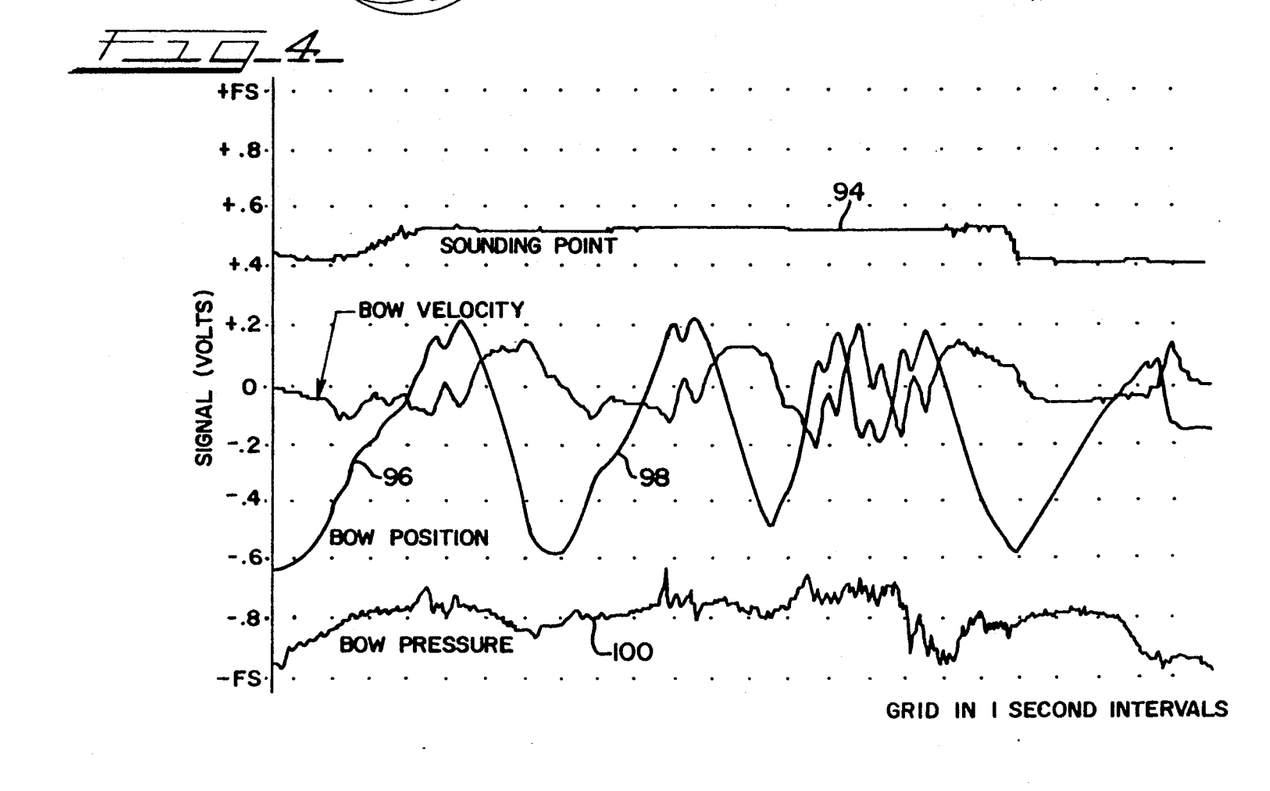
FIG. 4 is a time plot of parameters obtained during the playing of a passage of music.
Figure 5:
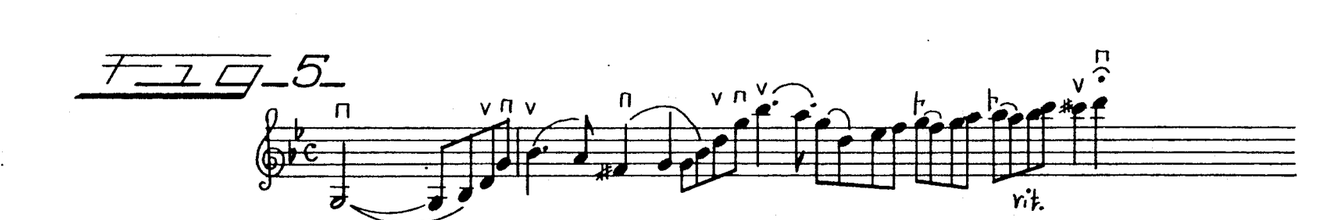
FIG. 5 is a musical passage showing the music being played in FIG. 4 to the same time base.

FIG. 4 is a time plot of parameters obtained during the playing of several measures of music, and FIG. 5 is a musical scale showing the music being played in FIG. 4 to the same time base. The music is the opening phrase of the Violin Concerto in G Minor by Bruch. In FIG. 4, a curve 94 of the sounding point is almost constant during most of the selection being played. A curve 96 of bow position, taken together with a curve 98 of bow velocity, lets a violin teacher tell where the bow is and what it is doing. Taken together with a curve 100 of bow pressure, the curves provide useful information about the bowing techniques of the player.

Figure 6:
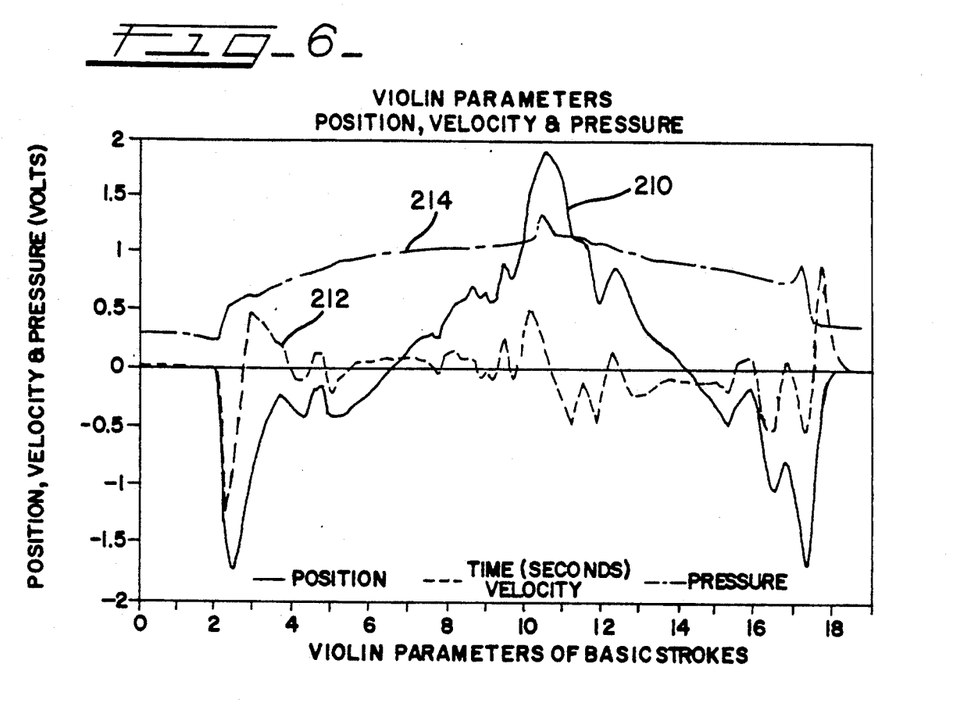
FIGS. 6-9 are time plots of bow velocity obtained from four sequential playings of the same selection by the same student.
Figure 7:
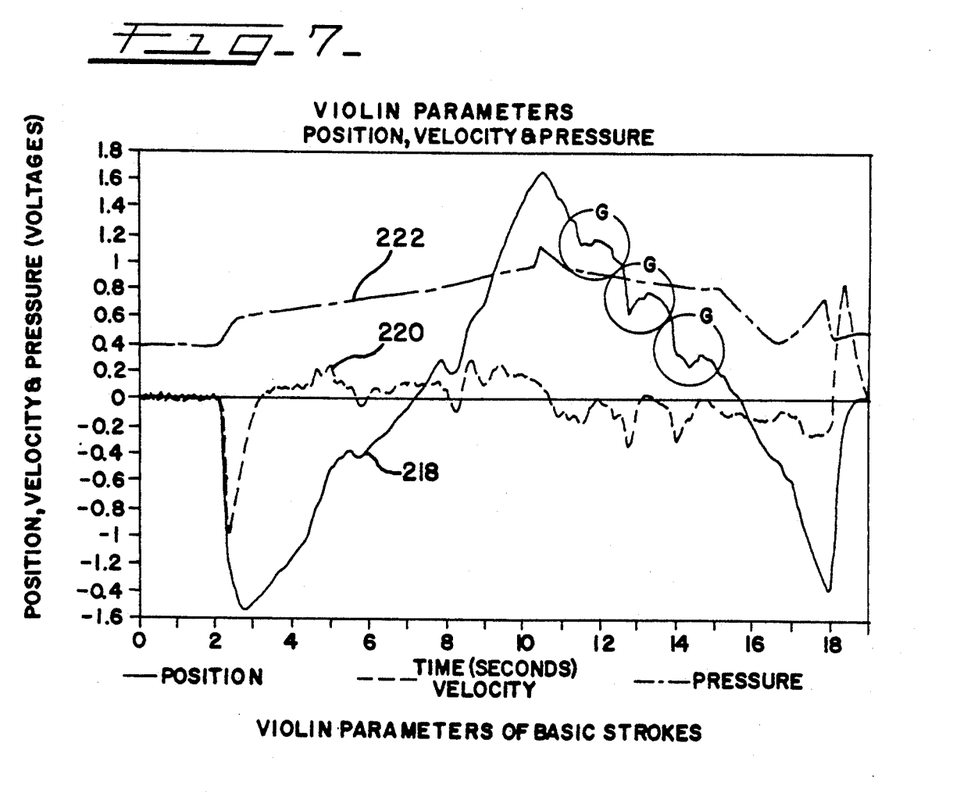
Figure 8:
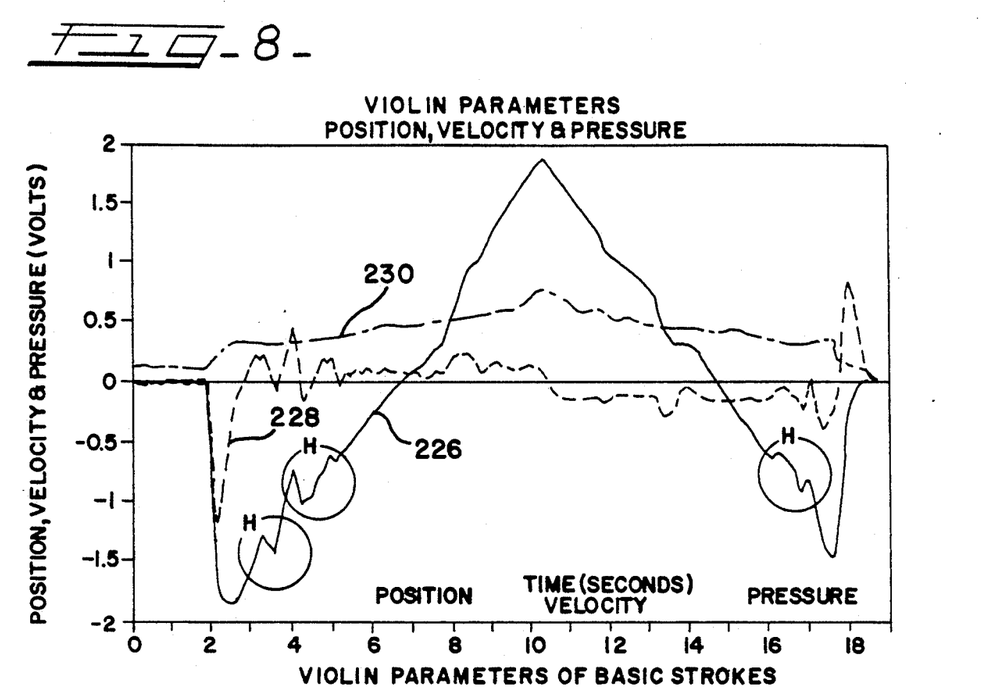
Figure 9:
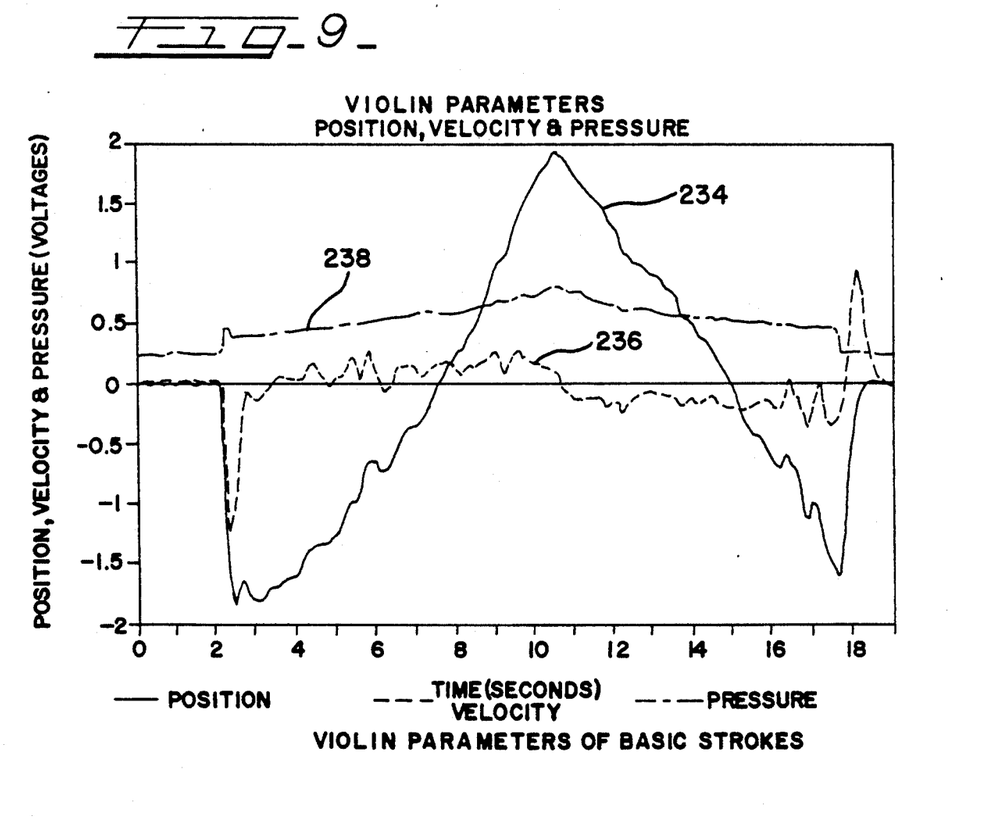

FIGS. 6–9 are time plots of bow position, velocity and pressure obtained from four playings in time sequence of two notes on an open string. This means that the string was not fingered by the left hand. Each of the notes was held for eight beats, which was a time of about eight seconds. The first portion of each of the time plots represents down bowing and the second portion represents up bowing. FIG. 6 is the first playing, contrasting unsteady bowing on a violin with a sustained steady bowing of the violin that is shown later. In FIG. 6, a curve 210 shows bow position, a curve 212 shows bow velocity and a curve 214 shows bow pressure, all as functions of time. FIG. 7 is the second playing of the same two notes, showing improvement in the down bowing, the first eight seconds of time, but a lack of smoothness in the upbowing of the second half. In FIG. 7, a curve 218 shows position, a curve 220 shows velocity and a curve 222 shows pressure. The portions marked G in the curve 218 show the lack of smoothness. In FIG. 8, the third playing, a curve 226 shows bow position, a curve 228 shows bow velocity and a curve 230 shows bow pressure. FIG. 8 represents improved bowing in overall speed and pressure control, but the regions marked H show weakness in bow control near the frog. FIG. 9 is the fourth and last playing in time sequence of the same two notes. A curve 234 represents bow position, a curve 236 represents bow velocity and a curve 238 represents bow pressure, all as a function of time. FIG. 8 represents overall better bowing than the preceding three figures.

It should thus be evident that the curves of FIGS. 2 and 4 through 9 can be useful when displayed in real time, as on a computer monitor, and especially for displays of either real-time or stored curves on a color monitor, on which different curves can be displayed in different colors to facilitate understanding. The curves can also be stored for later analysis and for comparison by a student with such curves obtained after further training. Curves produced by masters can be stored and circulated to provide standards of comparison for students. A student can repeat a passage several times and observe his or her recorded parameters for consistency and for association of the form of the recorded parameters with the quality of the tone produced.

The embodiments of the invention that are shown here are intended to illustrate the practice of the invention in its best mode. They should not be taken to limit the scope of the invention, which should be limited only by the following claims and their equivalents.

I claim:

1. A method of obtaining and displaying information to assist in teaching and learning the production of tone in using a bow on strings of a stringed instrument comprising the steps of:
   a. developing a first electrical signal that is an analog to the position of a bowing point on the bow;
   b. developing a second electrical signal that is an analog to the velocity of the bow;
   c. developing a third electrical signal that is an analog to the pressure of the bow on the strings;
   d. developing a fourth electrical signal that is an analog to a sounding point of the bow on the strings;
   e. converting the first, second, third and fourth electrical signals to digital signals;
   f. applying the digital signals to a microcomputer;
   g. processing the applied digital signals in the computer to provide a display of the digital signals as a function of time; and
   h. displaying the digital signals as a function of time.

2. The method of claim 1 comprising in addition the step of storing the digital signals.

3. The method of claim 1 comprising in addition the steps of:
   a. storing digital signals previously produced;
   b. comparing the displayed digital signals with the stored signals; and
   c. recommending corrective action to a student based upon the comparison.

4. The method of claim 2 comprising in addition the steps of:
   a. storing digital signals previously produced;
   b. comparing the stored digital signals with the stored digital signals previously produced; and
   c. recommending corrective action to the student who produced the stored digital signals.

5. An apparatus to assist in teaching and learning production of tone in using a bow on strings of a stringed instrument comprising:
   a. a position sensor disposed in the bow to provide a first electrical parameter that is a measure of position of the bow;
   b. a pressure sensor disposed in the bow and in the stringed instrument to provide a second electrical signal that is a measure of pressure on the bow;
   c. a bowing location sensor disposed on the stringed instrument to provide a second electrical parameter that is a measure of bowing location;
   d. a first bridge connected to the position sensor to convert the first electrical parameter to a first electrical signal;
   e. a converter connected to the pressure sensor to convert the second electrical parameter to a second electrical signal;
   f. a second bridge connected to the bowing location sensor to convert the second parameter to a third electrical signal;
   g. a differentiator connected to the first bridge to receive the first electrical signal and differentiate the received first electrical signal to produce a differentiated first electrical signal;
   h. an analog-to-digital converter connected to each of the bridges, the differentiator and the converter to produce a digital version of each of the first, second, third and differentiated first electrical signals;
   i. a microcomputer connected to each of the analog-to-digital converters to receive and process the digital versions of the signals from the analog-to-digital converters;
   j. a monitor connected to the microcomputer to display the digital versions of the signals from the analog-to-digital converters as a function of time; and
   k. means for storing the digital versions of the signals, the means for storing connected to the microcomputer.

6. The apparatus of claim 5 comprising in addition:
   a. a digital-to-analog converter connected to the microprocessor to receive digital signals from the microprocessor and convert the digital signals to analog signals;
   b. an amplifier connected to the digital-to-analog converter to receive and amplify the analog signals; and
   c. a speaker connected to the amplifier to convert the amplified analog signals to audible sound.

* * * * *